United States Patent
Kuntz

(10) Patent No.: US 7,473,870 B2
(45) Date of Patent: Jan. 6, 2009

(54) METHOD FOR MAKING A RADIATION HEATING STRUCTURE

(75) Inventor: Marc Kuntz, Moret-sur-Loing (FR)

(73) Assignee: Electricite de France, Paris (FR)

( * ) Notice: Subject to any disclaimer, the term of this patent is extended or adjusted under 35 U.S.C. 154(b) by 455 days.

(21) Appl. No.: 10/535,090

(22) PCT Filed: Nov. 10, 2003

(86) PCT No.: PCT/FR03/03348

§ 371 (c)(1),
(2), (4) Date: May 13, 2005

(87) PCT Pub. No.: WO2004/047492

PCT Pub. Date: Jun. 3, 2004

(65) Prior Publication Data

US 2006/0081612 A1    Apr. 20, 2006

(30) Foreign Application Priority Data

Nov. 13, 2002    (FR)    .................................. 02 14180

(51) Int. Cl.
*H05B 3/06*    (2006.01)
*D04H 3/08*    (2006.01)

(52) U.S. Cl. ........................ 219/542; 219/544; 156/180; 156/166; 156/433; 156/441; 264/136; 264/137; 425/112; 425/114

(58) Field of Classification Search ................ 156/180, 156/166, 433, 441; 264/136, 137; 425/112, 425/114; 219/544, 542
See application file for complete search history.

(56) References Cited

U.S. PATENT DOCUMENTS 4,888,472 A    12/1989    Stitz
5,783,013 A *    7/1998    Beckman et al. ............ 156/180

FOREIGN PATENT DOCUMENTS

| EP | 0 959 306 | | 11/1999 |
|---|---|---|---|
| WO | 00 30406 | | 5/2000 |
| WO | 0030406 | * | 5/2000 |

* cited by examiner

*Primary Examiner*—Shawntina Fuqua
(74) *Attorney, Agent, or Firm*—Patzik, Frank & Samotny Ltd.

(57) ABSTRACT

The invention concerns a method for making a radiation heating structure comprising a heating film electrically powered to produce Joule heating, a radiating film comprising radiating additives and a thermally insulating film. The insulating film and the radiating film are fixed on either side of the heating film. The structure is obtained by double injection of polymerizable resins in a heating mould, a first resin being filled with radiating additive on the side of the heating film and a second more fluid resin on the side of the insulation.

19 Claims, 2 Drawing Sheets

METHOD FOR MAKING A RADIATION HEATING STRUCTURE

FIELD OF INVENTION

The invention relates to the field of heating elements, such as radiation heating panels.

BACKGROUND OF THE INVENTION

Heating structures of this type, which are substantially in the form of a sheet, comprise a heating layer that includes at least one electrical resistor intended to be electrically powered in order to produce Joule heating. This heating layer is advantageously fixed between two reinforcement layers that are preferably electrically insulating.

The heating layer is fixed between the two reinforcement layers by injecting a resin that is cured when the temperature is raised, thereby also stiffening the heating structure obtained.

To give this structure thermal radiation properties, the injected resin is filled with radiating additives, such as plaster particles.

However, the resin thus filled, once cured, does not allow the aforementioned reinforcements and/or electrical resistor to be satisfactorily bonded, and debonding of one element of the heating structure, when in service, has often been observed.

The present invention aims to improve the situation.

SUMMARY OF THE INVENTION

In one embodiment, the present invention provides a radiation heating structure, comprising at least:
- a heating layer comprising at least one electrical resistor intended to be electrically powered in order to produce Joule heating;
- a radiating layer, comprising predominantly radiating additives; and
- a substantially thermally insulating layer, the insulating layer and the radiating layer being placed on either side of the heating layer.

Advantageously, this heating structure is substantially in the form of a sheet, with an insulating face and, opposite it, a radiation heating face. The term "in the form of a sheet" denotes both a plane form and a substantially curved, or even bent, form.

The present invention also proposes a process for manufacturing such a heating structure, in which:
a) a laminate comprising at least the aforementioned electrical resistor and reinforcements is introduced into a mold; and
b) injected into the mold:
  via an opening formed in a first wall of the mold opposite one face of the laminate intended to form the radiating layer, is a first resin that is filled with radiating additives and can be cured in the mold; and
  via an opening formed in a second wall of the mold opposite one face of the laminate intended to form the insulating layer, is a second resin that is more fluid than the first resin and can be cured in the mold.

The insulating character of the thermally insulating layer is advantageously conferred by an insulating sheet that is introduced with the aforementioned laminate into the mold so as to face the second wall via which the more fluid, second resin is injected. Additionally, or as a variant, the second resin may include insulating additives and, despite the presence of such insulating additives, may still be more fluid than the first resin.

In one advantageous embodiment, the manufacture of the heating structure is carried out by pultrusion and the aforementioned mold is a pultrusion mold having an entry end and an exit end, between which, in step b), said laminate is made to advance while the first and second resins are being injected. Preferably, this advance is sufficiently rapid to limit any diffusion of the radiating additives into the second wall of the mold.

In a preferred embodiment, the respective injection rates of the first and second resins are chosen according to the speed of advance of the aforementioned laminate through the pultrusion mold and so as to limit any diffusion of the radiating additives into the second wall of the mold, while ensuring diffusion of the radiating additives into the heating layer.

The object of the present invention is also a mold for implementing the process, which mold comprises:
  a first wall and a second wall opposite said first wall;
  first means for injecting a first resin, which can be cured in the mold and is filled with mineral additives, via a first opening in the mold formed in said first wall; and
  second means for injecting a second resin, which can be cured in the mold and is more fluid than the first resin, via a second opening formed in said second wall.

In a preferred embodiment, this mold is a pultrusion mold and includes, for this purpose, an entry end and an exit end, between which the aforementioned laminate can advance.

BRIEF DESCRIPTION OF THE DRAWINGS

Other features and advantages of the invention will become apparent on examining the following detailed description and the appended drawings in which.

DETAILED DESCRIPTION OF THE INVENTION

Figure 1:
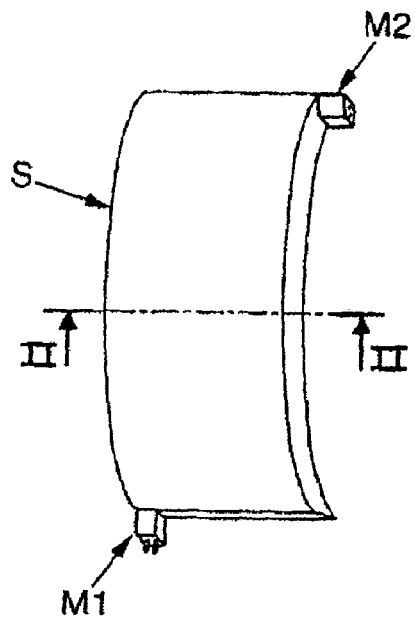
FIG. 1 shows schematically a heating structure S within the meaning of the present invention.

Referring firstly to FIG. 1, the heating structure S has the general form of a substantially curved sheet. The heating structure S is electrically powered via at least one connection module Ml provided on an end edge of the heating structure S.

This heating structure S may be intended for heating domestic rooms, as home radiators connected to the electrical mains. In other applications, the heating structure S may be used as a reinforcing structure (such as a reinforcing beam, or else a plinth) in industrial or domestic premises, or even in public places. In such an application, a plurality of heating structures S, in the form of heating panels, may for example be provided, these being joined to one another via electrical connection modules M1 and M2, in order to form the covering of a wall, or else a number of reinforcing beams for a construction, either in industrial premises or in a public place (a bus shelter or the like).

The heating structure S may be of not insignificant benefit in other applications, such as heated stadium seats or as home bathtubs (thus allowing water to be kept at the desired temperature).

Another particularly advantageous application is in the automobile field. A radiation heating structure of the type shown in FIG. 1 may be used for demisting a windshield, such a structure forming an integral part of or acting as the dashboard of the passenger compartment of a motor vehicle, or else acting as side reinforcements in the passenger compartment.

Figure 2:
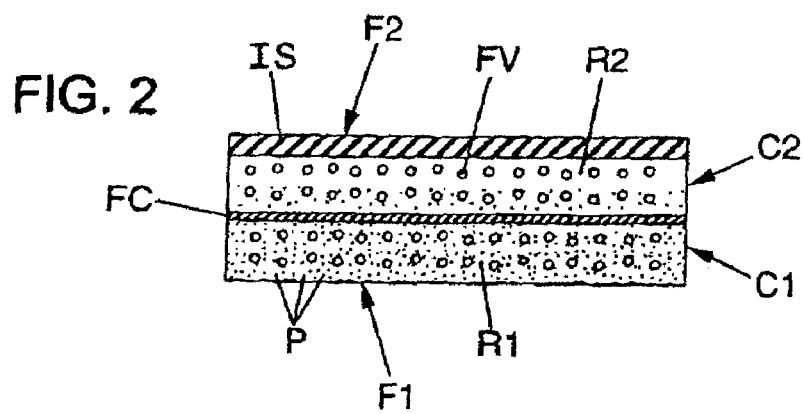
FIG. 2 shows schematically a cross-sectional view (along the line of section II-II) of the heating structure S of FIG. 1.

Referring now to FIG. 2, the heating structure within the meaning of the present invention comprises a heating film FC sandwiched between two reinforcement layers C1 and C2. Each reinforcement layer C1 and C2 comprises an array FV of glass or carbon fibers, each embedded in respective resins R1 and R2, which cure when the temperature is raised, for example in a pultrusion mold as will be seen later.

More particularly, the reinforcement layer C1 comprises a resin R1 filled with particles P which act as radiating additives. For example, such radiating additives may be iron, aluminum, wood or vermiculite particles. In an advantageous embodiment, these particles are mineral particles, such as marble particles. In a preferred embodiment, these radiating additives are plaster particles, the plaster having at least the following advantages:

- at high temperature, it releases water, giving the heating structure S a flame-retarding effect;
- it is of low cost;
- it increases the stiffness of the structure; and
- its heat radiation properties give the heating structure S its desired radiating character.

Thus, such pulverulent additives, with a high emissivity, give the heating structure S radiation heating properties. The application of such a radiating structure S is advantageous in (but not limited to) open public areas in which a flow of air is regularly circulating and for which convective heating would be prohibitively expensive. In addition, radiation heating provides the feeling of soft heating, with no air mixing, by emission of electromagnetic waves in the infrared range. On receiving these waves, the walls, floors and other elements of a room "convert" them into heat.

In the abovementioned applications of the heating structure according to the present invention, it is preferable for the structure S to radiate only via one of its faces F1 so as to limit the electrical consumption and thus maintain a satisfactory degree of conversion of electrical power into heat. For this purpose, the heating structure S furthermore includes an insulating layer IS on its face F2, opposite the radiating face F1. For example, the insulator IS may be a sheet of mineral wool, such as glass wool or, preferably, rock wool.

The heating film FC contains at least one electrical resistor. For this purpose, said heating film FC may be formed from a plastic film on which one or more resistors have been screen-printed. As a variant, it is also possible to envision using carbon fiber fabric. In yet another variant, there may be an array of conducting wires. In general, it should be pointed out that the heating film FC is formed from one or more types of electrically resistive materials intended to be electrically powered and capable of producing heat by the Joule effect when an electrical current flows through them.

Advantageously, the use of a carbon fiber fabric ensures satisfactory impregnation of the resins R1 and R2 in which it is embedded, thereby making it possible to achieve good adhesion of the heating film FC in the heating structure S.

Thus, in the embodiment in which the heating film is a screen-printed film, it is advantageous to provide openings made in the film. The resins R1 and R2 can then interpenetrate during the in-mold injection step.

Moreover, it is also possible to provide a heating film FC produced in the form of a fabric of fibers, for example glass fibers, in which fabric an electrically conducting wire is over-stitched, or else the fibers of which are impregnated with a conductive polymer.

The radiating composite section that the heating structure S thus forms has a first face F1 with a high radiating power and an insulating second face F2, opposite the first one, while the reinforcements FV provide the structure S with satisfactory mechanical strength. The particles P, which are preferably plaster particles and are predominantly in the radiating reinforcement layer C1, ensure both a high emissivity and good mechanical strength of the structure S. In FIG. 2, it should be noted in particular that the reinforcement layer C2, which includes the insulator IS, contains substantially fewer radiating particles P than the reinforcement layer C1 intended to radiate. In the process for manufacturing the heating structure S within the context of the present invention, the first resin R1 is initially filled with particles P, in order to form the radiating layer C1, whereas the more fluid resin R2 contains no such radiating additives.

A process for manufacturing the structure S, by pultrusion in a preferred embodiment, will now be described with reference to FIG. 3.

The pultrusion process allows the manufacture of polymer-matrix sections reinforced with continuous reinforcements. The reinforcements, such as carbon or glass fibers or fabrics FV, come from bobbins B placed on supports at the front of the pultrusion machine. Moreover, the heating film FC, in an embodiment in which it is in the form of a carbon fiber fabric, and the insulating sheet IS, in the embodiment in which it is in the form of a rock wool sheet, are placed on supports that give it a freedom of rotation so that all of the bobbins are unwound continuously. Guides and racks 2 orient the fibers, the heating film and the insulating sheet, by placing them under substantially the same tension in order to constitute the backbone of the future composite forming the structure S. Thus presented in an organized form, they are impregnated with resins R1 and R2 at the entry of a die 1, which ensures that the whole assembly is held together and the resins are cured by heating. This die therefore has the shape of a heating mold (hereinafter called the "pultrusion mold"), into which the aforementioned first resin R1 and second resin R2 are injected. These first and second resins harden by curing in the pultrusion mold. The various constituents advance along the X axis by means of a traction device 3 located downstream of the pultrusion mold 1. The station 4 of the pultrusion installation comprises a cutting and ventilation device for thus recovering the heating structure S for which it now remains only to provide one or more connection modules M1 and M2 for connecting its heating film FC.

Advantageously, the resins injected (arrows R1 and R2) into the pultrusion mold 1 are thermoplastics. In this embodiment, the station 4 of the pultrusion installation may be preceded by a bending unit for bending the composite section output by the mold 1, so as to give it a curved or other such chosen shape. For this purpose, polymer matrices intended to form the protection layers C1 and C2, by impregnation of the carbon or glass fibers or fabrics FV, may advantageously be thermoplastic resins of the PBT (polybutylene terephthalate) type or else of the polycaprolactone type, allowing the structure output by the pultrusion mold to undergo a thermoforming operation.

Advantageously, the pultrusion makes it possible to obtain shapes of sections that are both plane and curved, or else more complex shapes of solid or hollow cross section.

Figure 4:
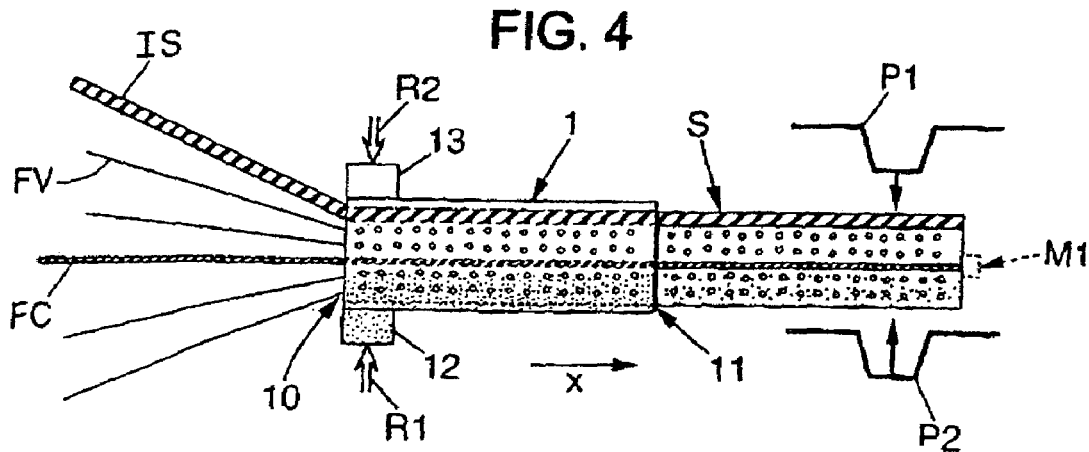
FIG. 4 shows schematically the heating structure S advancing through a pultrusion mold 1.
Figure 3:
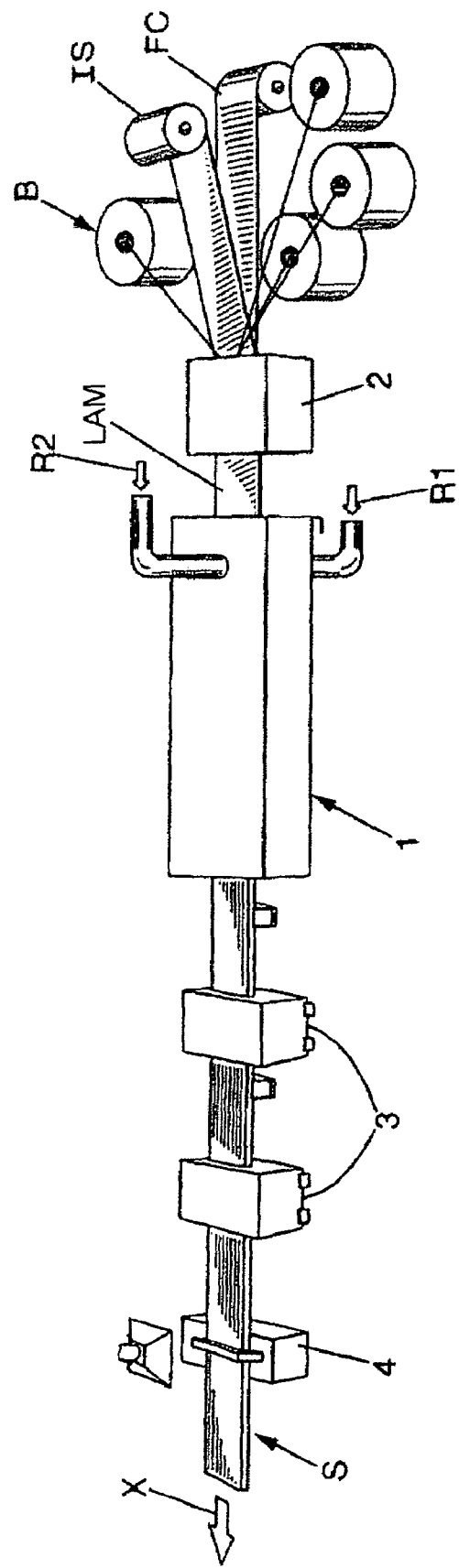
FIG. 3 shows schematically a pultrusion installation for the manufacture of heating structures.

The description now refers to FIG. 4 in which the laminate LAM of FIG. 3, formed by the insulating sheet IS, the heating film FC and the carbon or glass fibers FV, for example in woven form, is fed into the entry end 10 of the pultrusion mold 1. The laminate, comprising the insulating film IS and the heating film FC, placed among the reinforcement fibers FV, thus penetrates the mold in order to be impregnated with resins R1 and R2. The two resins are then injected (arrows R1 and R2) via openings 12 and 13 formed in the mold 1 on opposed walls and facing the heating film FC and the insulating sheet IS, respectively. The resin R2 is a standard resin (of the PBT type or else of the epoxy or other type). It is thus injected without radiating additives, in contact with the thermal insulation IS, into the upper portion of the mold 1. Satisfactory impregnation is thus guaranteed and better thermal insulation is provided in this region of the heating structure S being formed. The other resin R1 is injected into a lower portion of the mold 1. The resin R1 is more viscous and is filled with radiating additives in order to constitute the radiating matrix of the section. Preferably, the resin R1 substantially coats the heating film FC, which advantageously has openings in order to promote interpenetration of the two resins R1 and R2.

Preferably, the fluid resin R2 is injected via the opening 13 into an upper wall of the mold 1, whereas the viscous resin R1 is injected via the opening 12 placed in a lower wall of the mold 1, thereby making it possible, through gravity, to limit the contamination of the thermally insulating layer C2 by the radiating additives. Moreover, the respective flow rates of the resins R1 and R2 are controlled according to the speed of advance of the laminate LAM through the pultrusion mold 1, depending on the radiating additive content of the resin R1 and depending on the rate of cure of the resins at the temperature of the mold.

Typically, for a speed of the laminate through the mold of substantially between 0.5 and 1 m/minute, a flow rate of the fluid resin R2 of about 0.5 to 1.5 l/minute and a flow rate of the viscous resin R1 of about 0.5 to 1.5 l/minute for a mass of about 900 kg of radiating additives per $m^3$ of resin of the thermosetting polyester type are provided. The resins R1 and R2, of the aforementioned type, cure in the pultrusion mold 1 at temperatures of around 100 to 150° C.

The preformed heating structure S is withdrawn via the exit end 11 of the pultrusion mold 1 and advances to a bending unit equipped with a press comprising pressing members P1 and P2 for giving the structure S a chosen shape by bending, in a preferred embodiment in which the resins R1 and R2 are thermoplastics.

Finally, the process for manufacturing the heating structure S continues with the fitting of a connection module M1 in order to electrically power the heating film FC.

Of course, the present invention is not limited to the embodiment described above by way of example—it extends to other alternative embodiments.

Thus, it will be understood that, in a simplified embodiment of the heating structure S, one of the thicknesses of the reinforcements FV in the layer C1 or in the layer C2 may be omitted. However, it is advantageous to keep the electrically insulating reinforcements in the radiating layer C1. In this embodiment, a thickness of resin R2 may be maintained between a thermally insulating sheet IS and the heating film FC without reinforcements FV.

In the above embodiment, an insulating sheet IS is introduced into the laminate which is embedded in the resins R1 and R2. In an alternative embodiment, this insulating sheet may be omitted and the insulating character of the face F2 of the structure is provided by injecting a resin R2 that is itself filled with insulating additives, such as ceramic particles. The resin R2, even filled with such insulating additives, remains more fluid than the resin R1 filled with radiating additives, such as plaster particles. Of course, it will be understood that the insulating face F2 of the structure may furthermore comprise both an insulating sheet IS and a resin R2 filled with insulating additives of the aforementioned type, in applications in which it is advantageous to optimize the insulation of the face F2 of the heating structure within the context of the invention. These insulating additives have not been shown in the figures for the sake of clarity, but they are predominantly close to the insulating face F2.

The process described above for manufacturing the heating structure S is advantageously a pultrusion process. As a variant, composite sections for forming the heating structure S may be produced by any other forming technique, such as reaction molding or RIM (Reaction Injection Molding), or compression molding, such as BMC (Bulk Molding Compound) or SMC (Sheet Molding Compound).

In particular, within the scope of the present invention, a simple mold for injecting the resins R1 and R2 may be provided in which a laminate comprising at least reinforcing fibers FV and a heating film FC are held taut. A viscous resin R1 filled with radiating additives P and a more fluid resin R2 are injected into this heating mold via two opposed openings in order to consolidate all of the elements of the structure.

The invention claimed is:

1. A process for manufacturing a radiation heating structure, the structure comprising:
   a heating layer comprising at least one electrical resistor intended to be electrically powered in order to produce Joule heating;
   a radiating layer; and
   a substantially thermally insulating layer, the insulating layer and the radiating layer being fixed on either side of the heating layer, wherein:
   a) a laminate comprising at least said electrical resistor and reinforcements is introduced into a mold; and
   b) injected into the mold;
      via an opening formed in a first wall of the mold opposite one face of the laminate intended to form the radiating layer, is a first resin that is filled with radiating additives and can be cured in the mold; and
      via an opening formed in a second wall of the mold opposite one face of the laminate intended to form the insulating layer, is a second resin that is more fluid than the first resin and can be cured in the mold.

2. The process as claimed in claim 1, wherein said mold is a pultrusion mold having an entry end and an exit end and, wherein in step b), said laminate is made to advance between the two ends of the mold while said first and second resins are being injected, said advance being sufficiently rapid to limit any diffusion of the radiating additives into the second wall of the mold.

3. The process as claimed in claim 2, wherein the respective injection rates of the first and second resins are chosen according to the speed of advance of said laminate through the mold and so as to limit any diffusion of the radiating additives into said second wall of the mold, while ensuring diffusion of the radiating additives into the heating layer.

4. The process as claimed in claim 1, wherein said laminate furthermore includes a thermal insulator intended to he embedded in the second resin, this thermal insulator being placed, in said laminate, facing said second wall of the mold in order to form said insulating layer.

5. The process as claimed in claim 1, wherein, when the insulating layer and the radiating layer are each reinforced, said laminate comprises:

reinforcements;
at least one electrical resistor; and
reinforcements.

6. The process as claimed in claim 5, taken in combination with claim 4, wherein said laminate comprises:
reinforcements;
at least one electrical resistor;
reinforcements; and
a thermal insulator.

7. The process as claimed in claim 4, wherein the thermal insulator is a sheet of mineral wool, such as rock wool.

8. The process as claimed in claim 1, wherein the second resin includes insulating additives.

9. The process as claimed in claim 1, wherein the radiating additives are plaster particles.

10. The process as claimed in clam 1, wherein said reinforcements are fibers, such as glass fibers.

11. The process as claimed in claim 1, wherein said electrical resistor consists of a network of metal wires.

12. The process as claimed in claim 1, wherein said electrical resistor consists of a fabric of at least partly electrically conductive fibers.

13. The process as claimed in claim 1, wherein said electrical resistor consists eta screen-printed film.

14. The process as claimed in claim 1, wherein said first and second resins are thermoplastics.

15. A mold for implementing a process for manufacturing a radiation heating structure, wherein the mold comprises:
a first wall and a second wall opposite said first wall;
first means for injecting a first resin, which can be cured in the mold and is filled with radiating additives, via a first opening in the mold formed in said first wall; and
second means for injecting a second resin, which can he cured in the mold and is more fluid than the first resin, via a second opening formed in said second wall.

16. The mold as claimed in claim 15, wherein it furthermore includes an entry end and an exit end in order to implement said process by pultrusion.

17. A radiation heating structure having at least two external faces, wherein it comprises at least:
a heating layer comprising at least one electrical resistor intended to be electrically powered in order to produce Joule heating;
a radiating layer comprising predominantly radiating additives as a first external face; and
a thermally insulating layer as a second external face,
the insulating layer and the radiating layer being placed on either side of the heating layer.

18. The beating structure as claimed in claim 17, wherein the structure is substantially in the form of a sheet, with an insulating face and, opposite it, a radiation heating face.

19. The heating structure as claimed in claim 17, wherein the insulating layer and the radiating layer include reinforcing fibers.

* * * * *